(12) United States Patent
Finch et al.

(10) Patent No.: US 9,792,554 B2
(45) Date of Patent: Oct. 17, 2017

(54) AUTOMATIC CASE ASSIGNMENT BASED ON LEARNED EXPERTISE OF PRIOR CASELOAD

(71) Applicant: International Business Machines Corporation, Armonk, NY (US)

(72) Inventors: Richard B. Finch, New Paltz, NY (US); Jason T. Hirst, Poughkeepsie, NY (US); Gerald G. Stanquist, Salt Point, NY (US)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 14/486,331

(22) Filed: Sep. 15, 2014

(65) Prior Publication Data
US 2016/0078348 A1    Mar. 17, 2016

(51) Int. Cl.
*G06N 5/04*    (2006.01)

(52) U.S. Cl.
CPC ..................... *G06N 5/04* (2013.01)

(58) Field of Classification Search
CPC ........ G06N 5/04; G06N 99/005; G06N 7/005; H04M 3/5233
USPC .......................................................... 706/12
See application file for complete search history.

(56) References Cited

U.S. PATENT DOCUMENTS

| | | | |
|---|---|---|---|
| 7,668,789 B1 * | 2/2010 | Forman | G06N 99/005 706/12 |
| 8,370,127 B2 | 2/2013 | Jan et al. | |
| 8,472,611 B2 | 6/2013 | Chishti | |
| 8,867,733 B1 * | 10/2014 | Conway | H04M 3/5233 379/265.09 |
| 2009/0190748 A1 * | 7/2009 | Chishti | H04M 3/5232 379/265.13 |
| 2010/0111285 A1 * | 5/2010 | Chishti | H04M 3/5232 379/265.11 |
| 2011/0113095 A1 * | 5/2011 | Hatami-Hanza | G06F 17/30734 709/204 |
| 2011/0251984 A1 * | 10/2011 | Nie | G06F 17/30731 706/18 |
| 2012/0041769 A1 | 2/2012 | Dalal et al. | |

(Continued)

FOREIGN PATENT DOCUMENTS

WO    WO2013/148452 A1    10/2013

OTHER PUBLICATIONS

Hwang W. et al., "Bridging Centrality: Graph Mining from Element Level to Group Level", KDD'08, Aug. 24-27, 2008, Las Vegas, Nevada, USA.*

*Primary Examiner* — Dave Misir
(74) *Attorney, Agent, or Firm* — Stephen R. Tkacs; Stephen J. Walder, Jr.; Damion Josephs

(57) ABSTRACT

A mechanism is provided in a data processing system for automatic case assignment. The mechanism extracts features from a machine readable form of a case to be assigned. An expertise classifier generates an initial case assignment matrix matching the case to a plurality of caseworkers based on the extracted features, a caseworker relationship graph, and an entity relationship graph. A personnel filter filters the initial case assignment matrix based on expertise, availability, and caseload of the plurality of caseworkers to form a final caseworker assignment. The mechanism assigns the case to an identified caseworker based on the final caseworker assignment.

20 Claims, 5 Drawing Sheets

(56) References Cited

U.S. PATENT DOCUMENTS

| | | | |
|---|---|---|---|
| 2012/0117070 A1* | 5/2012 | Hiltz-Laforge | G06F 17/30699 707/740 |
| 2012/0197809 A1* | 8/2012 | Earl | G06Q 10/00 705/301 |
| 2013/0080461 A1* | 3/2013 | Byrne | G06F 17/30958 707/769 |
| 2013/0251138 A1* | 9/2013 | Spottiswoode | H04M 3/5232 379/265.12 |
| 2013/0262168 A1 | 10/2013 | Makanawala et al. | |
| 2013/0325763 A1* | 12/2013 | Cantor | G06Q 10/0633 706/12 |
| 2015/0278366 A1* | 10/2015 | Pilpel | G06F 17/30958 707/723 |

* cited by examiner

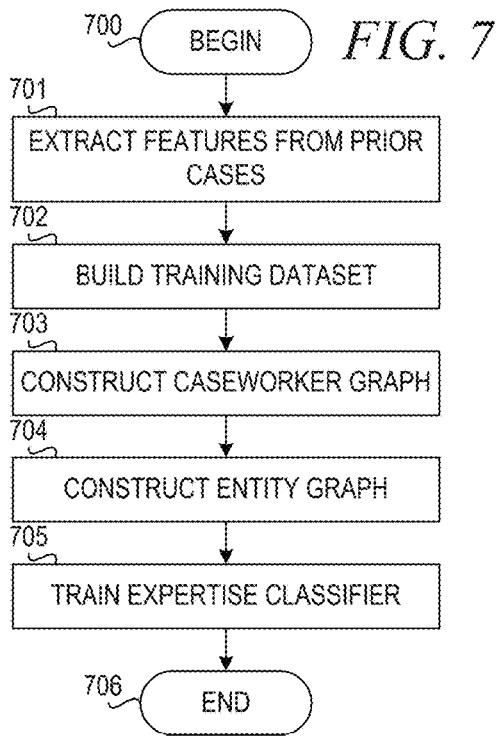
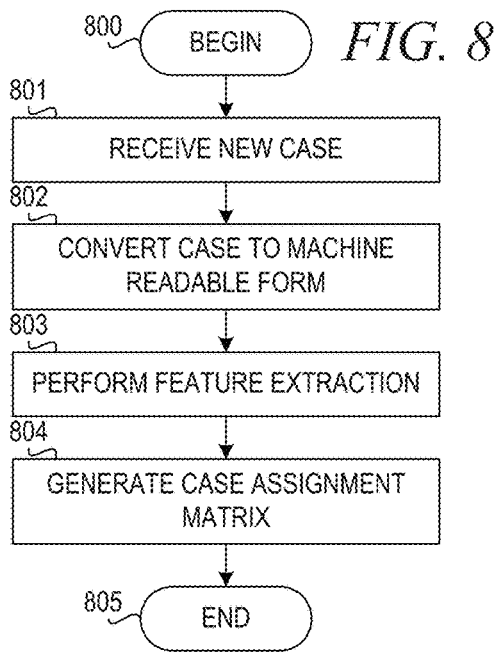
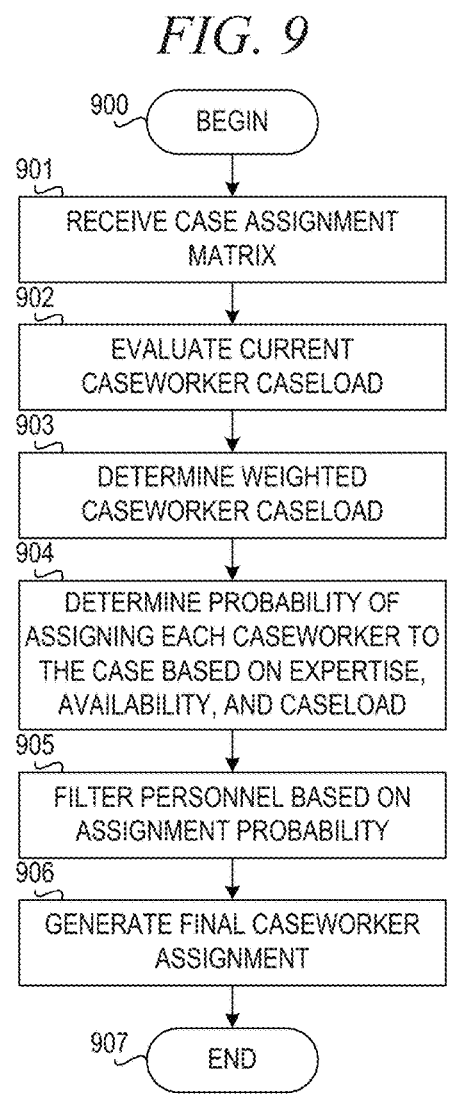

AUTOMATIC CASE ASSIGNMENT BASED ON LEARNED EXPERTISE OF PRIOR CASELOAD

BACKGROUND

The present application relates generally to an improved data processing apparatus and method and more specifically to mechanisms for automatic case assignment based on learned expertise of prior caseload.

Assignment of a case to a caseworker may consume a great deal of time trying to determine how to direct the case. The prior art focuses on call center mechanics, routing, and agent assignment based on either a directed scheme, such as round robin, to the agent who has waited the longest, etc., a rating scheme based on sales performance of the agent, agent qualifications, native language, etc. The prior art may use an approach where a call center application interprets the speech of the caller to determine keywords to use for the routing. The aim of such approaches is to either pair up a customer sales agent to a prospective paying customer or to match a customer inquiry to a predefined set of possible query categories e.g., "pay balance," "technical support," "new account," etc.).

SUMMARY

In one illustrative embodiment, a method, in a data processing system, is provided for automatic case assignment. The method comprises extracting, by the data processing system, features from a machine readable form of a case to be assigned. The method further comprises generating, by an expertise classifier in the data processing system, an initial case assignment matrix matching the case to a plurality of caseworkers based on the extracted features, a caseworker relationship graph, and an entity relationship graph. The method further comprises filtering, by a personnel filter in the data processing system, the initial case assignment matrix based on expertise, availability, and caseload of the plurality of caseworkers to form a final caseworker assignment. The method further comprises assigning, by the data processing system, the case to an identified caseworker based on the final caseworker assignment.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 is a flowchart illustrating operation of a training component in accordance with an illustrative embodiment;

FIG. 8 is a flowchart illustrating operation of a classifier front-end in accordance with an illustrative embodiment; and FIG. 9 is a flowchart illustrating operation of a personnel filter back-end in accordance with an illustrative embodiment.

DETAILED DESCRIPTION

The illustrative embodiments provide a mechanism to pair up a complex problem (i.e., the case) with a person who will evaluate the complex problem (i.e., the caseworker) based on a multi-tiered statistical machine learning approach. The illustrative embodiments provide a mechanism to assign cases based on the natural language learning of prior case files. The mechanism learns the expertise of each caseworker from prior cases and rates the expertise of a given caseworker based on the language in a new case. The mechanism also takes into account caseworker relationship graph centrality (i.e., how important a caseworker is to the caseworker network), caseworker relationships to name entities (positive and negative), as well as caseworker caseload and availability.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

Figure 1:
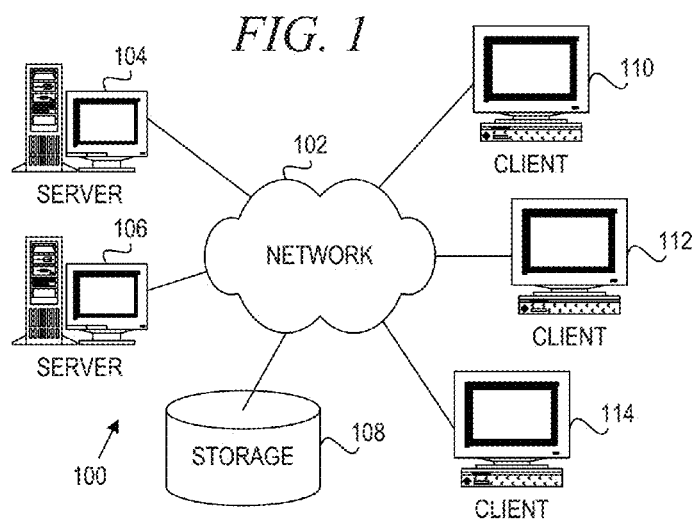
FIG. 1 is an example diagram of a distributed data processing system in which aspects of the illustrative embodiments may be implemented.
Figure 2:
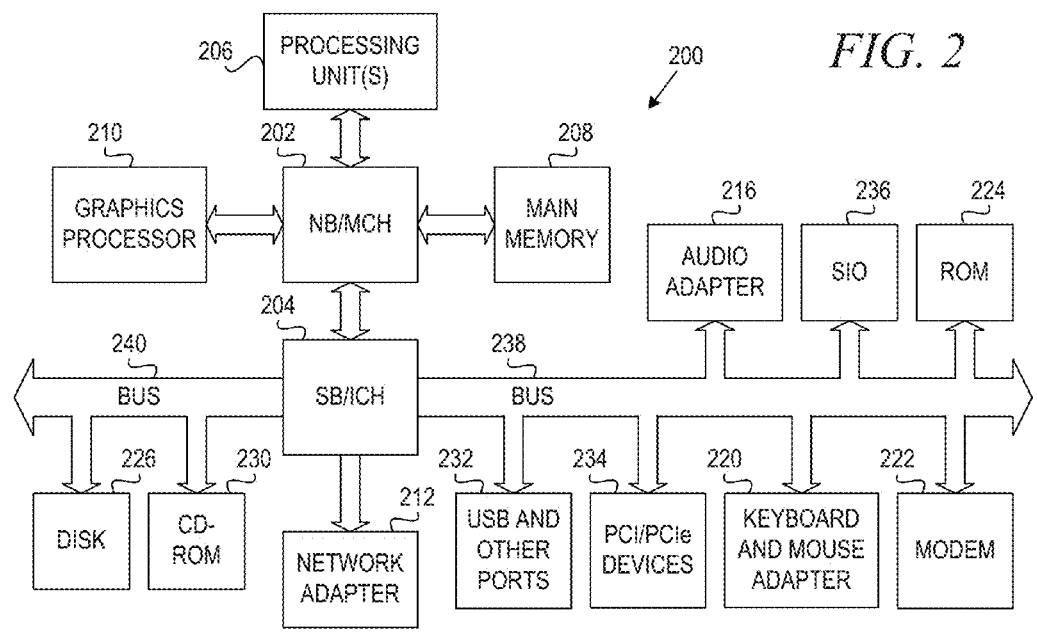
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An Object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
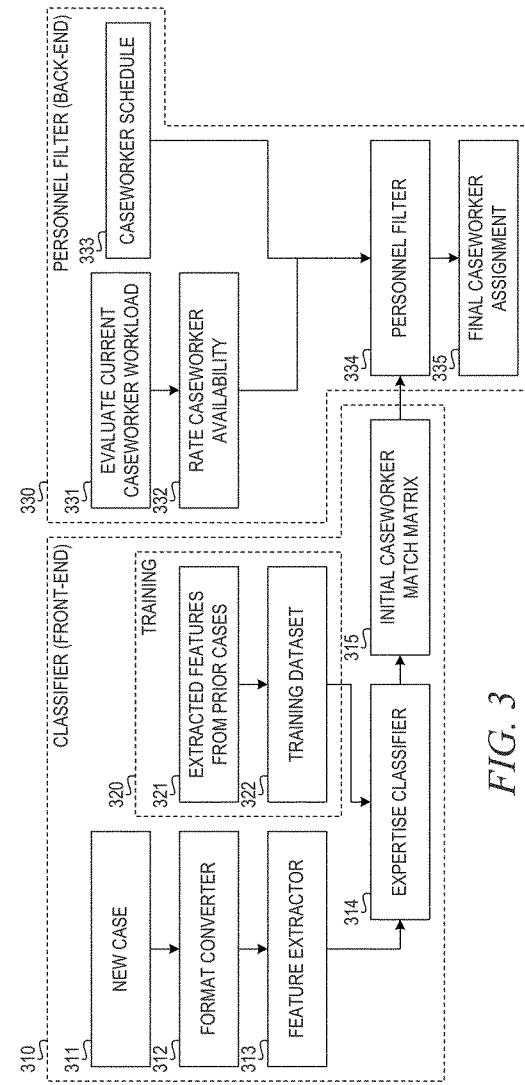
FIG. 3 is a block diagram illustrating a system for automatic case assignment based on learned expertise of prior caseload in accordance with an illustrative embodiment.

FIG. 3 is a block diagram illustrating a system for automatic case assignment based on learned expertise of prior caseload in accordance with an illustrative embodiment. The system comprises a classifier front-end 310 and a personnel filter back-end 330. The classifier front-end 310 includes a training component 320 for training expertise classifier 314. Training component 320 extracts features from prior cases 321 and builds a training dataset 322 in the form of a caseworker relationship graph and an entity relationship graph.

Figure 4:
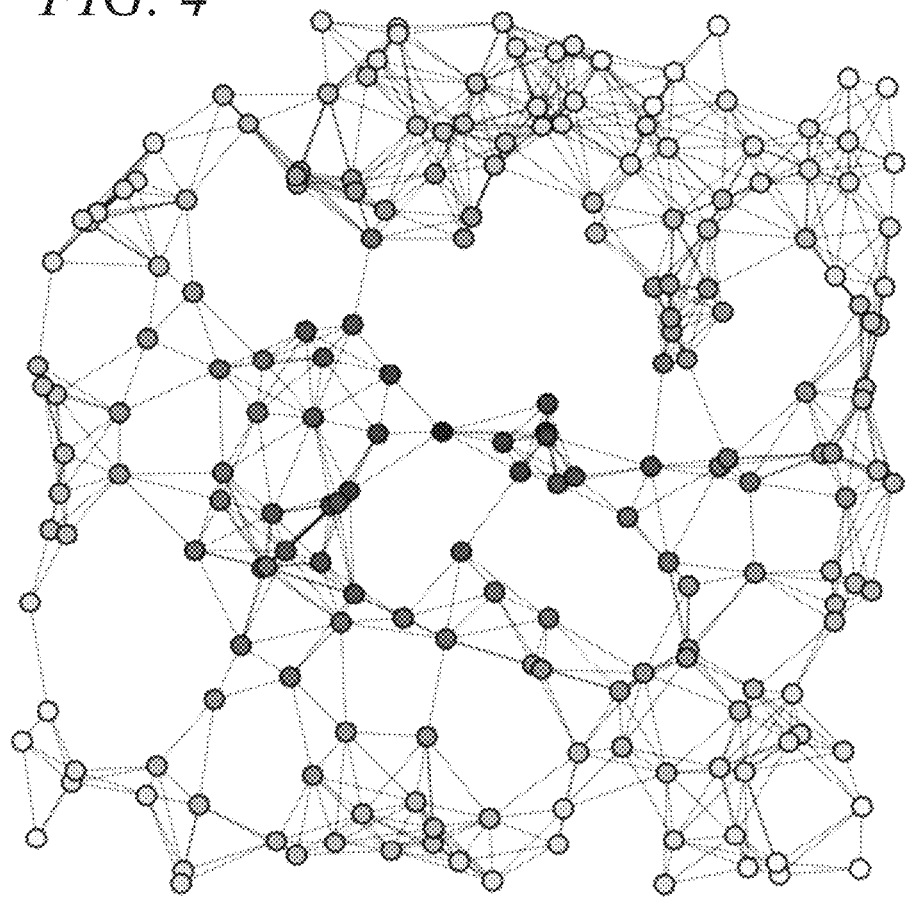
FIG. 4 depicts an example caseworker relationship graph in accordance with an illustrative embodiment.

Training component 320 constructs the caseworker relationship graph from caseworker relationships deduced from prior caseloads. Once the graph is constructed, training component 320 makes centrality measurements to determine the degree of each caseworker node (i.e., the number of incident vertices) and "betweenness" (i.e., the number of times a node is a bridge in the shortest path between two other nodes). FIG. 4 depicts an example caseworker relationship graph in accordance with an illustrative embodiment. In the depicted example, darker shaded nodes depict nodes with higher centrality measurements.

Figure 5:
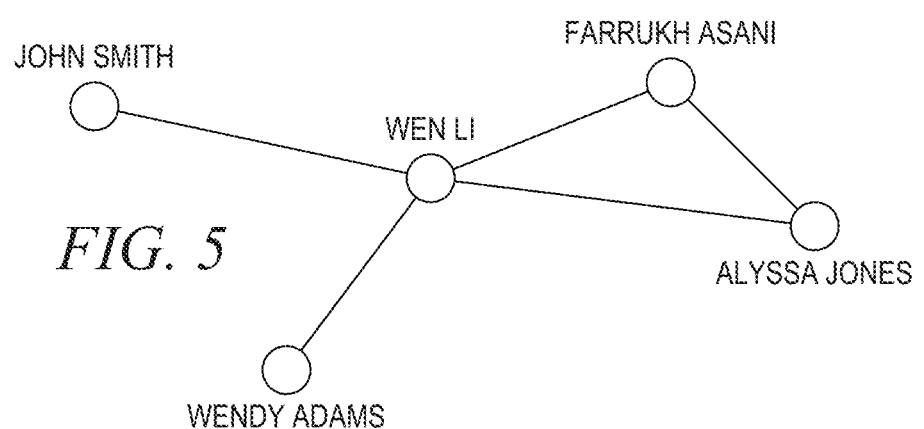
FIG. 5 depicts an example exploded view of several sample caseworker nodes in accordance with an illustrative embodiment.

FIG. 5 depicts an example exploded view of several sample caseworker nodes in accordance with an illustrative embodiment. In the example shown in FIG. 5, the node associated with Wen Li is more central in the relationship graph, because Wen Li has relationships with each of the other nodes and is central to the relationship between John Smith and Wendy Adams, the relationship between John Smith and Alyssa Jones, the relationship between John Smith and Farrukh Asani, the relationship between Wendy Adams and Alyssa Jones, and the relationship between Wendy Adams and Farrukh Asani. Therefore, the node associated with Wen Li is weighted higher than the other nodes shown in FIG. 5.

Figure 6:
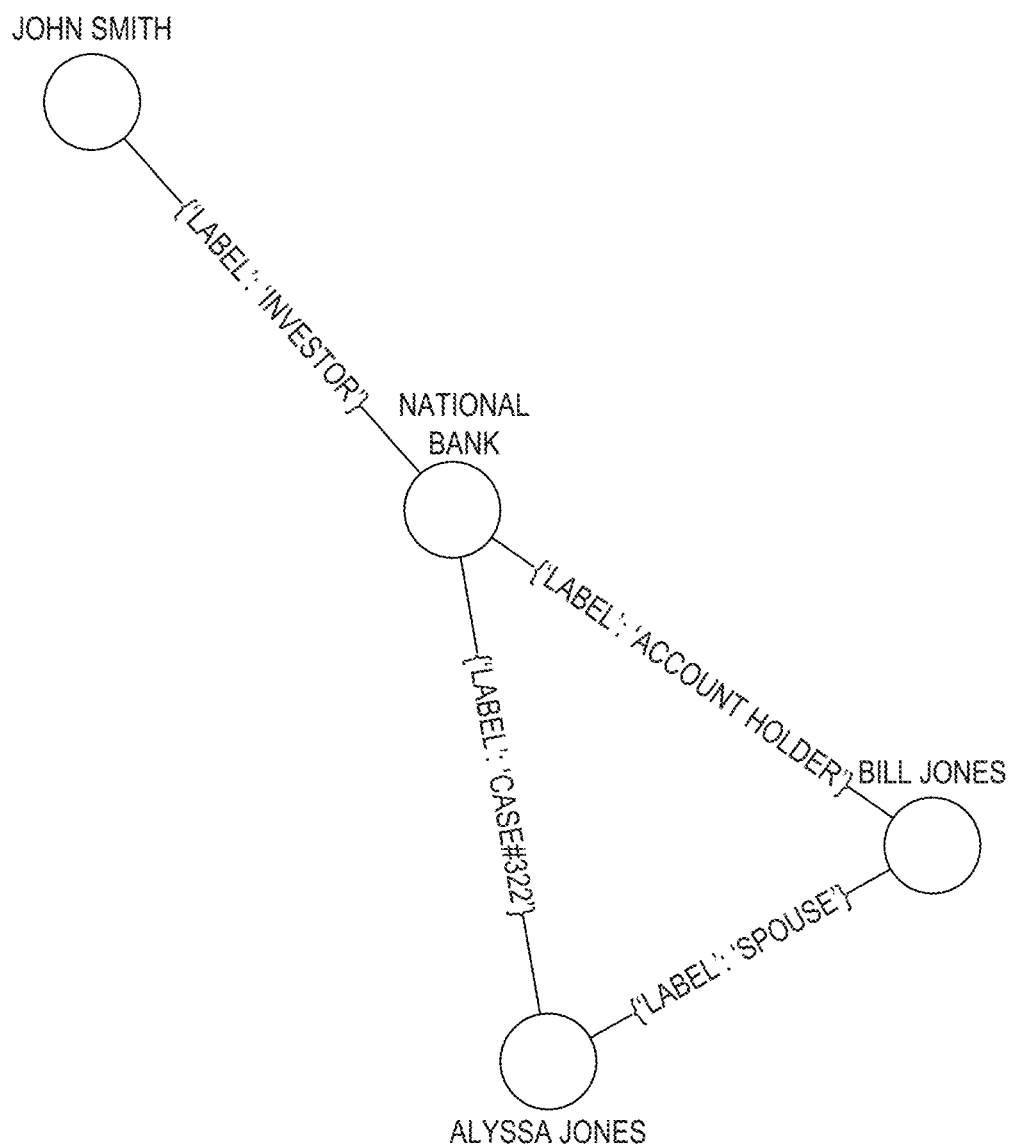
FIG. 6 depicts an example entity graph in accordance with an illustrative embodiment.

In addition to graphing caseworker relationships, training component 320 graphs named entity relationships from parsing prior caseloads, as well as using caseworker disclosures, if needed for a particular type of casework. Once the entity graph is constructed, training component 320 walks the graph to determine positive and/or negative relationships. FIG. 6 depicts an example entity graph in accordance with an illustrative embodiment. In the example depicted in FIG. 6, there is a possible conflict of interest for caseworker "John Smith" with regards to a potential case for "National Bank." Thus, John Smith would be seen as having a negative relationship with National Bank. On the other hand Alyssa Jones may be seen as having a positive relationship with National Bank because Alyssa Jones worked on a prior case with National Bank.

The illustrative embodiment depicted in FIG. 3 uses supervised machine learning to train the expertise classifier 314. For each of the prior case, training component 320 identifies features that are relevant to case assignment. Training component 320 utilizes the identified set of features to leant a mapping between caseworker expertise, entity relationships, and proper case assignment. Training component 320 assigns weights for the features, including caseworker relationships and entity relationships, to scale the prior case assignments. In one example embodiment, training component 320 uses a linear regression model to calibrate the weights that scale to known appropriate case assignments. The mapping of features and weights comprise a machine learning model.

In an alternative embodiment, training component 320 receives an initial set of parameters to generate a set of case assignments and allows users to provide feedback. Training component 320 then derives the weights that scale to the case assignments generated in this manner.

In yet another example embodiment, training component 320 uses a Bayesian classifier, entropy-based model, such as a decision tree or another appropriate technique known in the art.

Returning to FIG. 3, classifier front-end 310 receives a new case 311, and format converter 312 converts the new case to machine readable form. Format converter 312 provides textual input to feature extractor 313 and converts text form numerous formats, such as speech and scanned text, etc. Feature extractor 313 performs feature extraction 313 and provides the extracted feature to expertise classifier 314. Feature extractor 313 provides two tiers of feature extraction: keyword extraction to be used by a naïve Bayes probabilistic classifier and entity relationship extraction via natural language processing grammars to be used as the input to the entity graph constructor. Additionally, the feature extractor 313 may be customized for a particular field (e.g., legal field) to account for industry specific terms and idioms.

Classifier 314 is multi-tiered with each tier having customizable weighting. The first tier is the naïve Bayes keyword classifier. A Bayesian network is a probabilistic graphical model that represents a set of random variables and their conditional independencies via a directed acyclic graph (DAG). For example, a Bayesian network could represent the probabilistic relationships between caseworkers and between caseworkers and clients. The second tier consists of entity weightings (positive for positive entity relationships, negative and/or flagging for negative relationships, such as conflicts of interest), which are extracted by walking the entity graph. Classifier 314 uses caseworker disclosure information as input to an entity graph constructor. A final tier of classifier 314 generates the caseworker graph, initial caseworker match matrix 315, which is constructed from relationships built from prior case assignments (centrality assessment).

The initial caseworker match matrix 315 provides a weighted graph matching caseworkers to cases based on how central each caseworker is to the particular field of the case and the relationship of each caseworker to the named entities in the case. For example, a caseworker may have a high centrality measurement because the caseworker has a large number of incident vertices and the number of times the caseworker is a bridge between two other caseworkers in the caseworker relationship graph. However, the caseworker may have a negative relationship with an entity associated with the case. Thus, the initial caseworker match matrix 315 provides weighted matches of caseworkers and cases based on he information from the caseworker relationship graph and the entity graph.

Classifier 314 passes initial caseworker match matrix 315 to personnel filter back-end 330. Personnel filter back-end 330 evaluates current caseworker workload 331 and rates caseworker availability 332. Using the rated caseworker availability 332 and caseworker schedule 333, personnel titter 334 filters the initial caseworker match matrix 315 to generate final caseworker assignment 335.

Personnel filter 334 provides a mechanism for choosing the most probable caseworker for the new case based on the following:

1) Probability that the caseworker has expertise based on the output of the classifier: P1[0-1];

2) Availability of the caseworker (caseworker schedule): P2[0 or 1];

3) Weighted caseworker caseload caseworker caseload can be computed using a number of methods, such as the number of cases, sizes of case files, complexity of cases by human evaluation, complexity of cases by machine evaluation of features, etc.: P3[0-1].

Personnel filter 334 computes a final probability of assigning a caseworker to a case. Once personnel filter 334 computes a probability for all caseworkers, personnel filter 334 selects the most probable caseworker and assigns the case as final caseworker assignment 335. In one example embodiment, personnel filter 334 determines the final probability as follows:

$$P_f = P_1 * P_2 * P_3$$

In one example embodiment, personnel filter 334 applies the final probability value to each weighted match in the initial caseworker match matrix. As an example, if a caseworker has a high centrality value and a positive relationship with many named entities, the caseworker may be weighted highly in the initial caseworker match matrix; however, that caseworker would have little availability and a tight schedule giving that caseworker a lower probability of being assigned to a given case in the final caseworker assignment.

In one example embodiment, classifier front-end 310, training component 320, and personnel filter back-end 330 execute within a separate data processing systems. For instance, classifier front-end 310 and personnel fitter back-end 330 may execute within different servers, different physical machines, or different virtual machines. In one embodiment, classifier front-end 310 executes on a client data processing system that has access to personnel filter back-end 330 via an Application Programming Interface (API) or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 7 is a flowchart illustrating operation of a training component in accordance with an illustrative embodiment. Operation begins (block 700), and the training component extracts features from prior cases (block 701). The training component builds a training dataset (block 702). Based on the training dataset, the training component constructs a caseworker relationship graph (block 703) and constructs an entity relationship graph (block 704). The training component then trains the expertise classifier based on known prior case assignments and the relationships of entities in the caseworker relationship graph and the entity relationship graph (block 705). Thereafter, operation ends (block 706).

FIG. 8 is a flowchart illustrating operation of a classifier front-end in accordance with an illustrative embodiment, Operation begins (block 800), and the classifier front-end receives a new case (block 801). The classifier front-end converts the case to machine readable form (block 802). The classifier front-end then performs feature extraction (block 803). Then, using the caseworker relationship graph and the entity relationship graph, the classifier front-end generates a case assignment matrix (block 804). Thereafter, operation ends (block 805).

FIG. 9 is a flowchart illustrating operation of a personnel filter back-end in accordance with an illustrative embodiment. Operation begins (block 900), and the personnel filter back-end receives the case assignment matrix from the classifier front-end (block 901). For each caseworker, the personnel filter back-end evaluates the current caseload (block 902) and determines a weighted caseworker caseload (block 903). Then, the personnel filter back-end determines a probability of assigning each caseworker in the case assignment matrix to the case based on expertise, availability, and caseload (block 904). The personnel filter back-end filters personnel based on the assignment probability (block 905). The personnel filter back-end then generates the final caseworker assignment (block 906), and operation ends (block 907).

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide a mechanism for pairing up a complex problem (the case) with a person who will evaluate the complex problem (the caseworker) based on a multi-tiered statistical machine learning approach, taking into account statistical occurrences of keywords, caseworker network centrality, caseworker positive and negative relationships to named entities parsed from prior cases, current caseworker caseload, and caseworker scheduling. The mechanism trains a statistical model based on prior cases and forms a caseworker relationship graph and an entity relationship graph. The mechanism parses text of a case and extracts features. Based on those features and using a machine learning model trained using prior cases, the mechanism generates an initial matrix matching caseworkers to a case.

The mechanism also determines a probability of assigning the case to each caseworker based on expertise determined based on relationship centrality, availability of the caseworker based on the caseworker's schedule, and weighted caseworker workload. The mechanism applies the determined probability of each caseworker to the initial matrix and assigns the case to the most probable caseworker.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments.

The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for automatic case assignment, the method comprising:
   extracting, by the data processing system, features from a machine readable form of a case to be assigned, wherein the features include named entities in the case;
   generating, by an expertise classifier in the data processing system, an initial case assignment matrix matching the case to a plurality of caseworkers based on the extracted features, a caseworker relationship graph, and an entity relationship graph, wherein the caseworker relationship graph represents relationships between caseworkers deduced from prior caseloads, wherein the entity relationship graph represent relationships between caseworkers and entities extracted from prior case assignments, wherein the initial case assignment matrix comprises a weighted graph matching the plurality of case workers to the case based on how central each caseworker is to a field of the case and relationship of each caseworker to the named entities in the case;
   filtering, by a personnel filter in the data processing system, the initial case assignment matrix based on expertise of the plurality of caseworkers, availability of the plurality of caseworkers, and caseload of the plurality of caseworkers to form a final caseworker assignment; and
   assigning, by the data processing system, the ease to an identified caseworker based on the final caseworker assignment.

2. The method of claim 1, further comprising training the expertise classifier using the prior case assignments, comprising:
   extracting features from the prior case assignments;
   building a training dataset from the features of the prior case assignments;
   constructing the caseworker relationship graph from the features of the prior case assignments;
   constructing the entity relationship graph from the features of the prior case assignments; and
   training the expertise classifier based on the training dataset, the caseworker relationship graph, and the entity relationship graph to form a machine learning model, wherein the expertise classifier generates the initial case assignment matrix based on the features extracted from the case using the machine learning model.

3. The method of claim 1, wherein generating the initial case assignment matrix comprises classifying the named entities in the case using a naïve Bayes probabilistic classifier.

4. The method of claim 3, wherein generating the initial case assignment matrix comprises determining entity weightings for the named entities by walking the entity relationship graph.

5. The method of claim 1, wherein generating the initial case assignment matrix comprises determining a centrality value for each caseworker based on the caseworker relationship graph.

6. The method of claim 1, wherein extracting features comprises extracting keywords from the case.

7. The method of claim 1, further comprising converting the case to text from speech or scanned text.

8. The method of claim 1, wherein filtering the initial case assignment matrix comprises for each given caseworker:
   determining a first probability, $P_1$, that the given caseworker has expertise to complete the case based on a centrality value of the caseworker;
   determining a second probability, $P_2$, that the given caseworker will be available to complete the case based on a schedule of the caseworker;
   determining a third probability, $P_3$, that the given caseworker will complete the case based on a weighted caseworker caseload.

9. The method of claim 8, wherein filtering the initial case assignment matrix further comprises determining the centrality value of the given caseworker using the caseworker relationship graph and determining the first probability based on the centrality value of the given caseworker.

10. The method of claim 8, wherein filtering the initial case assignment matrix further comprises determining the weighted caseworker caseload of the given caseworker based on a current caseload of the given caseworker and determining the third probability based on the weighted caseworker caseload.

11. The method of claim 10, wherein determining the weighted caseworker caseload comprises determining the weighted caseworker caseload based on a number of cases currently assigned to the given caseworker, sizes of cases currently assigned to the given caseworker, complexity of cases currently assigned to the given caseworker determined by user evaluation, and complexity of cases currently assigned to the given caseworker determined by machine evaluation of the features.

12. The method of claim 8, wherein filtering the initial case assignment matrix further comprises determining a final probability, $P_f$, of assigning the given caseworker to the case as follows:

$$P_f = P_1 * P_2 * P_3,$$

wherein the personnel filter identifies a caseworker having a highest final probability as the identified caseworker.

13. A computer program product comprising a computer readable storage medium having a computer readable program stored therein, wherein the computer readable program, when executed on a computing device, causes the computing device to:
   extract features from a machine readable form of a case to be assigned, wherein the features include named entities in the case;
   generate, by an expertise classifier, an initial case assignment matrix matching the case to a plurality of caseworkers based on the extracted features, a caseworker relationship graph, and an entity relationship graph, wherein the caseworker relationship graph represents relationships between caseworkers deduced from prior caseloads, wherein the entity relationship graph represents relationships between caseworkers and entities extracted from prior case assignments, wherein the initial case assignment matrix comprises a weighted graph matching the plurality of case workers to the case based on how central each caseworker is to a field of the case and a relationship of each caseworker to the named entities in the case;

filter, by a personnel filter, the initial case assignment matrix based on expertise of the plurality of caseworkers, availability of the plurality of caseworkers, and caseload of the plurality of caseworkers to form a final caseworker assignment; and assign the case to an identified caseworker based on the final caseworker assignment.

14. The computer program product of claim 13, wherein the computer readable program further causes the computing device to train the expertise classifier using the prior case assignments, comprising:

extracting features from the prior case assignments;

building a training dataset from the features of the prior case assignments;

constructing the caseworker relationship graph from the features of the prior case assignments;

constructing the entity relationship graph from the features of the prior case assignments; and training the expertise classifier based on the training dataset, the caseworker relationship graph, and the entity relationship graph to form a machine learning model, wherein the expertise classifier generates the initial case assignment matrix based on the features extracted from the case using the machine learning model.

15. The computer program product of claim 13, wherein filtering the initial case assignment matrix comprises for each given caseworker:

determining a first probability, $P_1$, that the given caseworker has expertise to complete the case based on a centrality value of the caseworker, determining a second probability, $P_2$, that the given caseworker will be available to complete the case based on a schedule of the caseworker, determining a third probability, $P_3$, that the given caseworker will complete the case based on a weighted caseworker caseload.

16. The computer program product of claim 15, wherein filtering the initial case assignment matrix further comprises determining the centrality value of the given caseworker using the caseworker relationship graph and determining the first probability based on the centrality value of the given caseworker.

17. The computer program product of claim 15, wherein filtering the initial case assignment matrix further comprises determining the weighted caseworker caseload of the given caseworker based on a current caseload of the given caseworker and determining the third probability based on the weighted caseworker caseload.

18. The computer program product of claim 17, wherein determining the weighted caseworker caseload comprises determining the weighted caseworker caseload based on a number of cases currently assigned to the given caseworker, sizes of cases currently assigned to the given caseworker, complexity of cases currently assigned to the given caseworker determined by user evaluation, and complexity of cases currently assigned to the given caseworker determined by machine evaluation of the features.

19. The computer program product of claim 15, wherein filtering the initial case assignment matrix further comprises determining a final probability, $P_f$, of assigning the given caseworker to the case as follows:

$$P_f = P_1 * P_2 * P_3,$$

wherein the personnel filter identifies a caseworker having a highest final probability as the identified caseworker.

20. An apparatus comprising:

a processor; and a memory coupled to the processor, wherein the memory comprises instructions which, when executed by the processor, cause the processor to:

extract features from a machine readable form of a case to be assigned, wherein the features include named entities in the case;

generate, by an expertise classifier, an initial case assignment matrix matching the case to a plurality of caseworkers based on the extracted features, a caseworker relationship graph, and an entity relationship graph, wherein the caseworker relationship graph represents relationships between caseworkers deduced from prior caseloads, wherein the entity relationship graph represents relationships between caseworkers and entities extracted from prior case assignments, wherein the initial case assignment matrix comprises a weighted graph matching the plurality of case workers to the case based on how central each caseworker is to a field of the case and a relationship of each caseworker to the named entities in the case;

filter, by a personnel filter, the initial case assignment matrix based on expertise of the plurality of caseworkers, availability of the plurality of caseworkers, and caseload of the plurality of caseworkers to form a final caseworker assignment; and assign the case to an identified caseworker based on the final caseworker assignment.

* * * * *